United States Patent [19]

Ferguson

[11] Patent Number: 4,900,177
[45] Date of Patent: Feb. 13, 1990

[54] SPLINE CENTERING DEVICE

[75] Inventor: John H. Ferguson, Sauquoit, N.Y.

[73] Assignee: Lucas Aerospace Power Transmission Corp., Utica, N.Y.

[21] Appl. No.: 388,348

[22] Filed: Aug. 2, 1989

[51] Int. Cl.[4] .............................................. B25G 3/00
[52] U.S. Cl. ...................................... 403/13; 403/359
[58] Field of Search ................................... 403/13, 359

[56] References Cited

U.S. PATENT DOCUMENTS

| | | | |
|---|---|---|---|
| 4,540,305 | 9/1985 | Geisthoff | 403/13 |
| 4,685,823 | 8/1987 | Lopez | 403/359 |
| 4,701,068 | 10/1987 | Andrews et al. | 403/359 |

FOREIGN PATENT DOCUMENTS 2019528 10/1979 United Kingdom .................. 403/13

*Primary Examiner*—Andrew V. Kundrat
*Attorney, Agent, or Firm*—Anthony F. Cuoco

[57] ABSTRACT

A spline centering device is arranged on a member having a spline in mating engagement with a spline on a member having a hole not otherwise having spline centering or piloting characteristics. The centering device features a spring loaded tapered member which locks into the hole to provide the required piloting affect and to therby reduce spline motion and spline tooth wear.

11 Claims, 1 Drawing Sheet

SPLINE CENTERING DEVICE

BACKGROUND OF THE INVENTION

This invention relates generally to mechanical couplings which connect rotatable shafts and particularly to a spline centering device for interconnecting rotating members.

Use of an internal spline which engages a mating external spline for transmitting torque is well known in the art. A straight spline which engages a mating straight spline for the purposes indicated does not have any centering means, and in order to limit wear of the spline, pilots are provided at both ends of the spline shaft assembly. If proper pilots are not provided and the splines do not mate with a close fit, relative spline tooth motion and therefore tooth wear occurs.

The present inventor is aware of U.S. Pat. No. 4,701,068 issued on Oct. 20, 1987 to Rodney R. Andrews, et al., which provides a spline anti-backlash device utilizing centrifugal forces for forcing teeth on a portion of an external spline to engage or lock onto the mating teeth on an internal spline.

U.S. Pat. No. 4,685,823 issued on Aug. 11, 1987 to Lopez, et al., teaches an arrangement wherein the teeth on an external spline are biased radially outward so that upon being inserted into a mating internal spline the teeth will intimately engage the teeth of the internal spline to provide an anti-backlash coupling.

Other prior art devices use various means to tighten on the spline teeth by providing a reacting torque.

The present invention uses a spring loaded tapered member to pick up a diameter that does not have pilot fit characteristics to provide the required spline centering.

SUMMARY OF THE INVENTION

This invention contemplates a spline centering device arranged on a member carrying a spline in mating engagement with a spline carried on a member having a hole with a tolerance in diameter and location so as to not otherwise have pilot fit characteristics. The centering device features a spring loaded tapered member which locks into the hole to reduce relative spline tooth motion and therefore tooth wear. The tapered member carries an arrangement of longitudinally extending, circumferentially disposed slots to provide a collet-like arrangement whereby the tapered member is tightened on a shaft carrying said member.

DETAILED DESCRIPTION OF THE INVENTION

Figure 1:
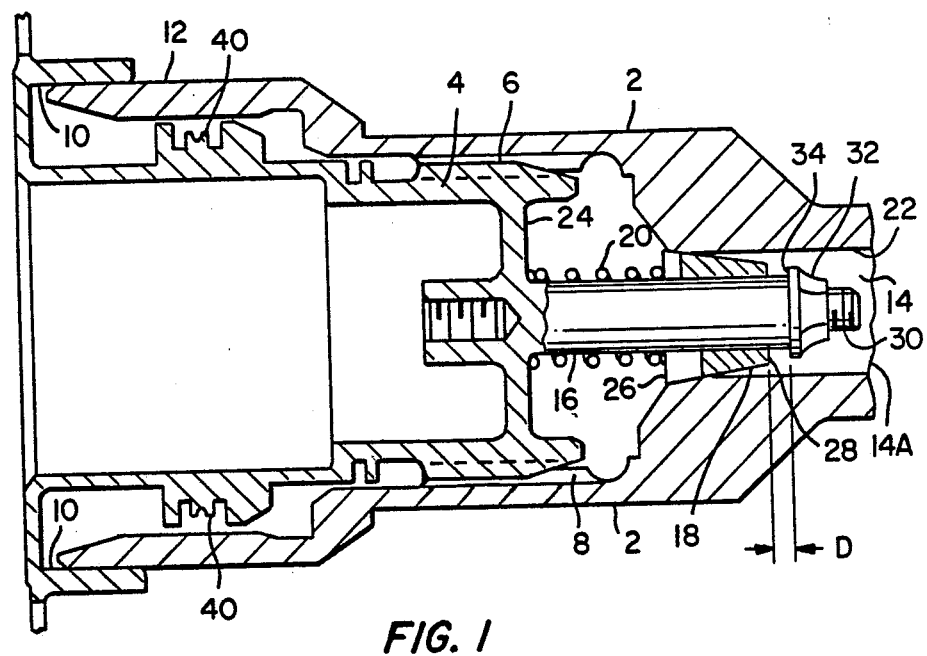
FIG. 1 is a sectioned front elevational view showing a mechanical coupling including an internal spline which engages a mating external spline for transmitting torque, and illustrating the spline centering device of the invention.

With reference to FIG. 1, a mechanical coupling assembly includes an external member 2 and an internal member 4. External member 2 carries an internal spline 8 and internal member 4 carries an external spline 6. Splines 6 and 8 are in mating engagement whereby the coupling assembly transmits torque as is well known in the art.

In order to reduce spline motion and spline tooth wear as aforenoted, spline pilots must be provided at both ends of the coupling assembly. In the arrangement shown, one end of internal member 4 has an internal diameter 10 which has a close tolerance in diameter and location so as to provide a pilot for the corresponding end 12 of external member 2.

The other end of member 2 has an internal hole 14 for receiving a longitudinally extending shaft portion 16 of member 4. Hole 14 has a tolerance in diameter and location so as to be unsuitable for providing a pilot at the other end of the coupling assembly as is required to reduce the aforenoted motion and ensuing wear. The present invention utilizes hole 14 to provide the required pilot. This is accomplished by using a tapered member 18 which is spring loaded via a coil spring 20 to pick up the inside diameter 22 of hole 14.

Figure 2:
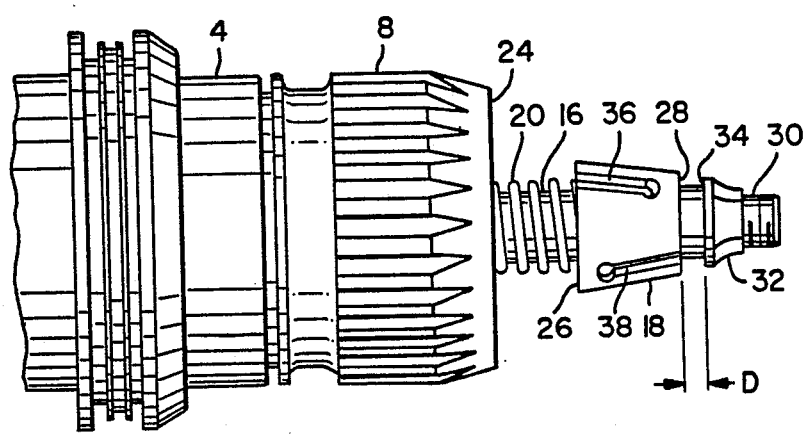
FIG. 2 is a pictorial representation illustrating a member carrying the external spline, and best showing the structural characteristics of the spline centering device of the invention.

FIG. 2 shows in substantial detail the portion of member 4 carrying spline 8 and longitudinally extending shaft portion 16. Spline 8 has a forward face 24 from which shaft portion 16 extends. Longitudinally extending shaft portion 16 carries tapered member 18 in sliding fit relation. In this regard tapered member 18 has a bore (not otherwise shown) extending therethrough so as to fit over shaft portion 16. Tapered member 18 has a rearward face 26 and a forward face 28. The end of shaft portion 16 has a threaded portion 30.

In assembling the coupling herein described member 4 is disposed within member 2 so that splines 6 and 8 are in mating engagement. Member 2 is piloted at its rearward end via diameter 10 of member 4. The end of longitudinally extending shaft portion 16 of member 4 extends into hole 14 in member 2.

Spring 20 is disposed over longitudinally extending shaft portion 16 so as to abut forward face 24 of spline 8. A nut 32 is in threaded engagement with threads 30 on the end of longitudinally extending shaft portion 16 and has a rearward face 34. Forward face 28 of tapered member 18 and rearward face 34 of nut 32 are spaced apart by a space D. Spring 20 abuts rearward face 26 of tapered member 18 so as to be captured between said rearward face and forward face 24 of spline 8. As particularly shown in FIG. 1, tapered member 18 is displaced so as to extend into hole 14 and tapers decreasingly outwardly into the hole. Nut 32 merely holds the aforenoted assembly together as will now be discerned, and other means known in the art may be used to accomplish this purpose as well. The displacement of tapered member 18 on shaft portion 16 must be enough to accommodate axial tolerances in the location of hole 14.

Thus, spring 20 is compressed and provides the appropriate spring loading or biasing of tapered member 18 so that the tapered member picks up diameter 22 as a pilot for the otherwise unpiloted end of the coupling. In other words, spring loaded tapered member 18 is locked into hole 14 to prevent relative motion between splines 6 and 8 and to thereby reduce spline tooth wear.

In connection with the compression of spring 20, it will be understood that power transmission members have some axial displacement capability and the compressibility of spring 20 represents a small portion of this capability. The compression of spring 20 is therefore provided by the power transmission member and the device (a gas turbine engine, for example) coupled to the other end of the member.

Tapered member 18 carries a pair of slots such as 36 and another pair of slots such as 38 disposed circumferentially around the tapered member. Slots 36 start at rearward end 26 of tapered member 18 and extend less than the full length of the tapered member. Slots 38 start at forward end 28 of tapered member 18 and likewise extend less than the full length of the tapered member. Slots 36 and 38 extend through tapered member 18 from the outside diameter to the inside diameter thereof. Thus, tapered member 18 is formed as a collet-like member to tighten the tapered member on shaft portion 16, by reducing the clearance between the tapered member and the shaft portion to some extent for further improving the pilot characteristics of the arrangement.

In the disclosed arrangement the primary need for lubrication is for the spline teeth, although the pilot members may need some lubrication to reduce fretting. For these purpose a suitable lubricating oil is introduced via hole end 14A and is sealed in the assembly via appropriate seals in grooves 40 shown in FIG. 1.

It will now be recognized that the invention as herein described provides a spline centering device and reduces spline motion and thereby spline tooth wear in a mechanical coupling arrangement where only one close tolerance spline pilot is otherwise provided. The invention accomplishes this by using a spring loaded tapered member to pick up a diameter as a spline pilot that does not otherwise have pilot fit characteristics.

With the aforegoing description of the invention in mind reference is made to the claims appended hereto for a definition of the scope of the invention.

What is claimed is:

1. A mechanical coupling including a first member having an internal spline, and a second member having an external spline in mating engagement with the internal spline and having a spline centering device, comprising:

the first member having a longitudinally extending internal hole on one end thereof, said hole not otherwise having diameter and location tolerances suitable for spline centering purposes;

the second member disposed within the first member so that the internal and external splines are in mating engagement, and the second member having a longitudinally extending shaft portion extending into the hole in the first member; and the longitudinally extending shaft portion carrying a spring biased tapered member for engaging the hole, the tapered member being longitudinally displaceable along the shaft portion for picking up the inside diameter of the hole as a pilot to provide the spline centering device for the coupling.

2. A mechanical coupling as described by claim 1, including:

the second member having a forward face, and the longitudinally extending shaft portion extending from the forward face into the hole in the first member;

spring means disposed around the longitudinally extending shaft portion and abutting the forward face;

the tapered member disposed on the longitudinally extending shaft portion in sliding fit relation, and having a rearward face abutting the spring means, and tapering decreasingly outwardly for engaging the hole; and the tapered member being longitudinally displaced on the shaft portion and biased by the spring means to a position in the hole in accordance with the diameter and location tolerances of the hole so that the hole is a pilot to provide the spline centering device for the coupling.

3. A mechanical coupling as described by claim 1, including:

the longitudinally extending shaft portion having an end extending into the hole in the first member;

retaining means engaging the end of the longitudinally extending shaft portion;

the tapered member disposed on the longitudinally extending shaft member in sliding fit relationship and having a rearward face and a forward face, with a space between the forward face and the retaining means, said tapered member having an outwardly decreasing taper engaging the hole;

spring means disposed on the longitudinally extending shaft portion so as to be captured between the second member and the rearward face of the tapered member; and the tapered member being displaced and biased by the spring means so that the outwardly decreasing taper of the tapered member is locked in the hole in accordance with the diameter and location tolerances of said hole so that said hole is a pilot to provide the spline centering device for the coupling.

4. A mechanical coupling including a first member having an internal spline and a second member having an external spline in mating engagement with the internal spline, comprising:

the second member disposed within the first member so that the internal and external splines are in mating engagement;

the second member having an internal diameter at one end thereof for receiving an external diameter at a corresponding end of the first member in a spline centering arrangement at the corresponding end of the coupling, and the first member having a longitudinally extending internal hole at the opposite end thereof, said hole not otherwise having diameter and location tolerances suitable for spline centering purposes;

the second member having a longitudinally extending portion extending into the hole in the first member; and the longitudinally extending portion carrying a spring biased tapered member for engaging the hole, whereby said tapered member picks up the inside diameter of the hole as a pilot to provide a spline centering arrangement at the opposite end of the coupling.

5. A mechanical coupling as described by claim 4, including:

the longitudinally extending portion having an end extending into the hole in the first member;

retaining means engaging said extending end;

the tapered member disposed in sliding fit relationship on the longitudinally extending portion and having a rearward face and a foward face, with a space between the forward face and the retaining means, said tapered member having an outwardly decreasing taper engaging the hole;

spring means disposed on the longitudinally extending portion and captured between the second member and the rearward face of the tapered member; and the tapered member being longitudinally displaced on the longitudinally extending portion and biased by the spring means for locking the outwardly decreasing taper in the hole in accordance with the diameter and location tolerances of said hole so that said hole is a pilot to provide the spline centering arrangement at the opposite end of the coupling.

6. A mechanical coupling as described by claim 2, including:

the tapered member carrying a plurality of slots disposed circumferentially therearound; and the slots being effective for tightening the tapered member on the longitudinally extending shaft portion.

7. A mechanical coupling as described by claim 6, including:

the slots extending from the outside diameter of the tapered member to the inside diameter thereof, with some of the slots extending from the rear face of the member forward and less than the full length of said member, and others of the slots extending from the forward face of said member rearward and less than the full length of said member.

8. A mechanical coupling as described by claim 5, including:

the tapered member carrying a plurality of slots disposed circumferentially therearound; and the slots being effective for tightening the tapered member on the longitudinally extending shaft portion.

9. A mechanical coupling as described by claim 8, including:

the slots extending from the outside diameter of the tapered member to the inside diameter thereof, with some of the slots extending from the rear face of the member forward and less than the full length of said member, and others of the slots extending from the forward face of said member rearward and less than the full length of said member.

10. A spline assembly with spline centering means, comprising:

a first member carrying an internal spline;

a second member carrying an external spline;

the second member disposed within the first member so that the splines carried by said members are in mating engagement;

the second member having an internal diameter on one end thereof for providing a pilot for an outside diameter on a corresponding one end of the first member;

the first member having a longitudinally extending internal hole on the other end thereof;

the second member having a longitudinally extending portion on its corresponding other end which is received by the hole;

the longitudinally extending portion carrying a spring loaded member which tapers decreasingly outwardly and is displaceable for engaging the hole, whereby the hole is effective for providing a pilot for the other end of the second member; and the pilot for the one end of the first member and the pilot for the other end of the second member cooperating to provide the spline centering means.

11. A spline assembly as described by claim 10, including:

the spring loaded member which tapers decreasingly outwardly for engaging the hole has a forward face and a rearward face, and has a plurality of slots disposed circumferentially therearound, the slots extending from the outside diameter of the tapered member to the inside diameter thereof, with some of said slots extending inwardly from the forward face of the tapered member and less than the full length thereof, and others of the slots extending outwardly from the rearward face of the tapered member and less than the full length thereof; and the slots being effective for decreasing the clearance between the tapered member and the longitudinally extending member to tighten said tapered member on said longitudinally extending member.

* * * * *